United States Patent [19]

Richards et al.

[11] Patent Number: 4,783,951

[45] Date of Patent: Nov. 15, 1988

[54] PNEUMATIC FINGER ATTACHMENT FOR HEADER UNIT

[76] Inventors: Lloyd Richards, P.O. Box 30; Thomas A. Mills, P.O. Box 89, both of Quairading, Australia

[21] Appl. No.: 143,217

[22] Filed: Jan. 7, 1988

Related U.S. Application Data

[63] Continuation of Ser. No. 784,232, Oct. 4, 1985, abandoned.

[30] Foreign Application Priority Data

Oct. 4, 1984 [AU] Australia ............................ PG7492

[51] Int. Cl.⁴ ............................................ A01D 57/10
[52] U.S. Cl. ...................................... 56/12.9; 56/158; 56/219; 56/DIG. 8
[58] Field of Search ...................................... 56/12–14, 56/219, 158

[56] References Cited

U.S. PATENT DOCUMENTS

| | | | |
|---|---|---|---|
| 2,054,161 | 9/1936 | Leonard | 56/312 |
| 2,718,744 | 9/1955 | Phillips | 56/DIG. 8 |
| 2,734,331 | 2/1956 | Phillips | 56/158 |
| 2,737,006 | 3/1956 | Flingler | 56/219 |

FOREIGN PATENT DOCUMENTS

| | | |
|---|---|---|
| 150752 | 4/1953 | Australia . |
| 159497 | 10/1954 | Australia . |
| 260400 | 9/1964 | Australia . |
| 34815 | 9/1970 | Australia . |
| 534795 | 3/1981 | Australia . |
| 751113 | 1/1967 | Canada ................................ 56/158 |
| 2808243 | 8/1979 | Fed. Rep. of Germany ....... 56/12.9 |

Primary Examiner—John Weiss
Attorney, Agent, or Firm—Harness, Dickey & Pierce

[57] ABSTRACT

The harvesting system has a crop cutting device disposed transversely of the direction of travel of the harvesting machine. A crop combing device is disposed adjacent to and extends forwardly of the cutting device. There is provided a pneumatic arrangement for generating a bed of air moving across the combing device in the direction towards the cutting device and generally parallel to the cutting plane of the cutting device. The moving bed of air facilitates gathering of the crop and reduces grain loss. The pneumatic arrangement includes nozzles for discharging air whereby to create said bed and a delivery system for delivering air under pressure to the nozzles. The nozzles are located in the plane of the bed and the delivery system is disposed generally beneath the combing device. Also disclosed is a finger attachment for a known harvesting system of agricultural machines. The finger attachment facilitates conversion of the known harvesting system to a harvesting system according to the invention. A method of harvesting is also disclosed.

10 Claims, 2 Drawing Sheets

PNEUMATIC FINGER ATTACHMENT FOR HEADER UNIT

This is a continuation of U.S. patent application Ser. No. 784,232, filed Oct. 4, 1985, abandoned.

BACKGROUND OF THE INVENTION

This invention relates to agricultural harvesting machinery, and more particularly to a harvesting system and finger attachment for the same, and a method of harvesting.

Harvesting machines of the type with which the present invention finds particular utility generally have a cutting assembly comprising a series of fixed fingers which extend forwardly from a cutting platform and are shaped to receive a transversely reciprocating knife therein rearwardly of their leading point.

To facilitate combing and subsequently capture of a crop, it has been known to attach an auxiliary finger attachment to the fixed fingers which essentially defines a leading horizontal platform. The platform provides an additional surface with which to capture shattered heads of the combed crop prior to delivery to the cutting platform and also heads having an unusually long stem which have a tendency to fall forwardly on cutting.

This arrangement has met with some success in overcoming the loss of grain attributable to head shattering and the cutting of long stems, but still has certain deficiencies in that incumbent ears or heads which locate on the platforms are no longer effectively induced towards the cutting platform and can easily fall to the ground over the sides of the platforms.

In machines which do not have the auxiliary finger attachment, it has been known to introduce an air flow across the cutting platform from a blower and pressurized air manifold to assist in the transport of cut crop to the feed conveyor of a harvester. These systems are generally characterized by discharging air through a series of outlet tubes which depend from the air manifold normally disposed in an elevated position relative to the cutting platform. The principal object of these systems has been to dispense with the usually requisite reel for "open" front machines or the flail for "closed" front machines. Although such systems have found favour amongst the farming community, it is common knowledge that they are limited in application to light crops alone, since a substantial amount of air pressure is required to induce heads forward of the cutting assembly into the air flow in much heavier crops. Thus in the heavier crops it is still necessary to use a reel or the like to direct the combed crop towards the cutting assembly and platform. Obviously, in systems having an elevated air manifold and depending discharge tubes, it is not possible to have a reel positioned on the header without first removing the air flow delivery apparatus. This can be both tedious and time consuming and hence is an obvious deficiency with previously proposed systems of this kind.

It is an object of the invention to provide means and a method which results in a reduction in the loss of grain experienced due to premature shattering of crop heads and the cutting of heads having long stems.

It is a preferred object of the present invention to allow the use of a reel, flail or the like together with an air flow system to facilitate harvesting.

It is another preferred object of the present invention to provide an air flow system which facilitates cleaning of the cutter bar assembly together with augmenting the gathering of the harvested crop.

SUMMARY OF THE INVENTION

In one form the invention resides in a harvesting system for agricultural machines comprising:

a crop cutting means disposed transversely of the direction of travel of the harvesting machine;

a crop combining means disposed adjacent to and extending forwardly of the cutting means; and a pneumatic means for generating a bed of air moving across the combing means in the direction towards the cutting means and generally parallel to the cutting plane of the cutting means, the pneumatic means including nozzle means for discharging air whereby to create said bed and delivery means for delivering air under pressure to the nozzle means, the nozzle means being located in the plane of the bed and the delivery means being disposed generally beneath the combing means.

With this arrangement the delivery means is clear of the region above the combing means thereby permitting use of a reel, flail or like transporting means.

Preferably, the nozzle means comprises a plurality of spaced nozzles and the delivery means includes a respective air delivery duct communicating with each nozzle.

Preferably there is provided a further nozzle means for generating an air flow upwardly through the combing means. This air flow further assists in preventing grain losses.

In another form the invention resides in a harvesting system for agricultural harvesting machines comprising:

a crop cutting means disposed transversely of the direction of travel of the harvesting machine;

a crop combing means disposed adjacent to and extending forwardly of said cutting means, said combing means having a plurality of receiving platforms collectively defining a generally planar surface forward of said cutting means;

at least some of said receiving platforms each having an outlet nozzle disposed on the upper face thereof to receive a forced air supply, whereby the nozzles are arranged to direct a forced air flow towards the cutting means, generally parallel to said surface to augment the gathering of said crop.

According to a preferred feature of said another form of the invention, the combing means comprises a plurality of fingers each provided with said platform, and each having an air delivery duct disposed beneath said platform, the air delivery duct communicating with a respective one of the nozzles on the platform.

According to another preferred feature, the rear end of the platform terminates adjacent the cutting means to expose the cutting means to the forced air flow from said outlet nozzles.

According to another preferred feature, a forced air supply is connected to a series of further outlet nozzles disposed rearwardly of said first outlet nozzle beneath said platform and cutting means, whereby said further outlet nozzles are intended to provide a further air flow passed the cutting means and platform, through the plane of said surface to further augment the gathering of said crop.

In still another form, the invention resides in a finger attachment for a harvesting system of the type comprising a crop cutting means disposed transversely of the direction of travel of the harvesting machine; a crop combing means disposed adjacent to and extending forwardly of said cutting means, said combing means comprising a plurality of fixed fingers, and a forced air supply delivered to said combing means; said finger attachment comprising a receiving platform, and an outlet nozzle disposed on said platform, said finger attachment adapted to be affixed to a said finger so that said outlet nozzle can be connected to said forced air supply to direct a forced air flow towards the cutting means, generally parallel to the surface of said platform to augment the gathering of said crop.

In still another form, the invention resides in a method of harvesting a crop comprising the steps of: propelling a cutting means, transversely disposed to the direction of travel, through said crop, combing said crop for the cutting means with a combing means disposed adjacent to and extending forwardly of said cutting means, said combing means having a plurality of receiving platforms collectively defining a generally co-planar surface forward of said cutting means; and supplying a forced air flow along and generally parallel to said surface towards the cutting means from an outlet nozzle disposed on the platform to augment the gathering of said crop.

BRIEF DESCRIPTION OF THE DRAWINGS

The invention will be better understood in the light of the following description of several specific embodiments thereof. The description is made with reference to the accompanying drawings wherein.

DETAILED DESCRIPTION OF THE PREFERRED EMBODIMENTS OF THE INVENTION

Figure 1:
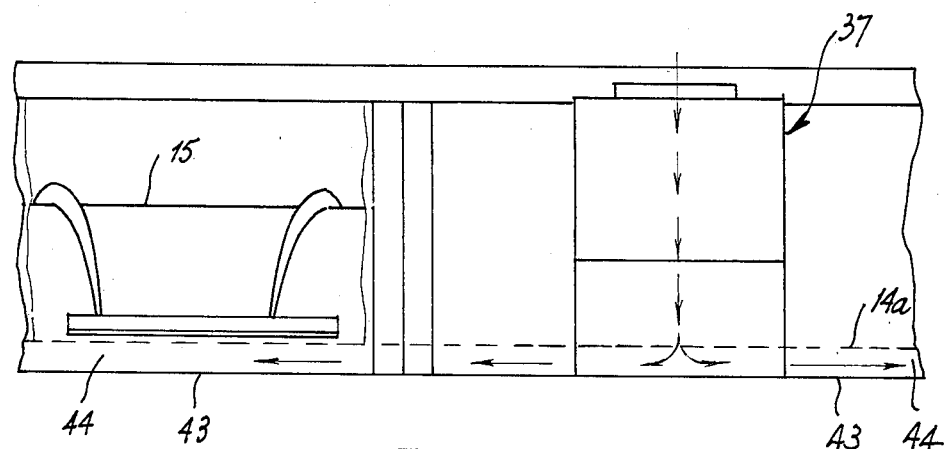
FIG. 1 is a rear fragmentary view of the header of the harvesting machine in accordance with the first embodiment of the invention.
Figure 2:
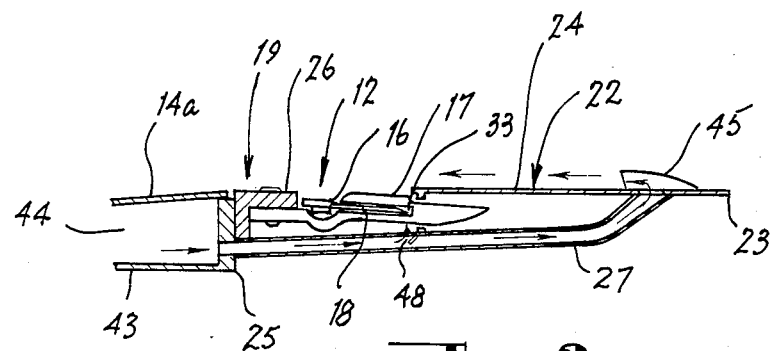
FIG. 2 is a fragmentary side elevation of the cutter bar assembly and auxiliary finger attachment for the header.
Figure 3:
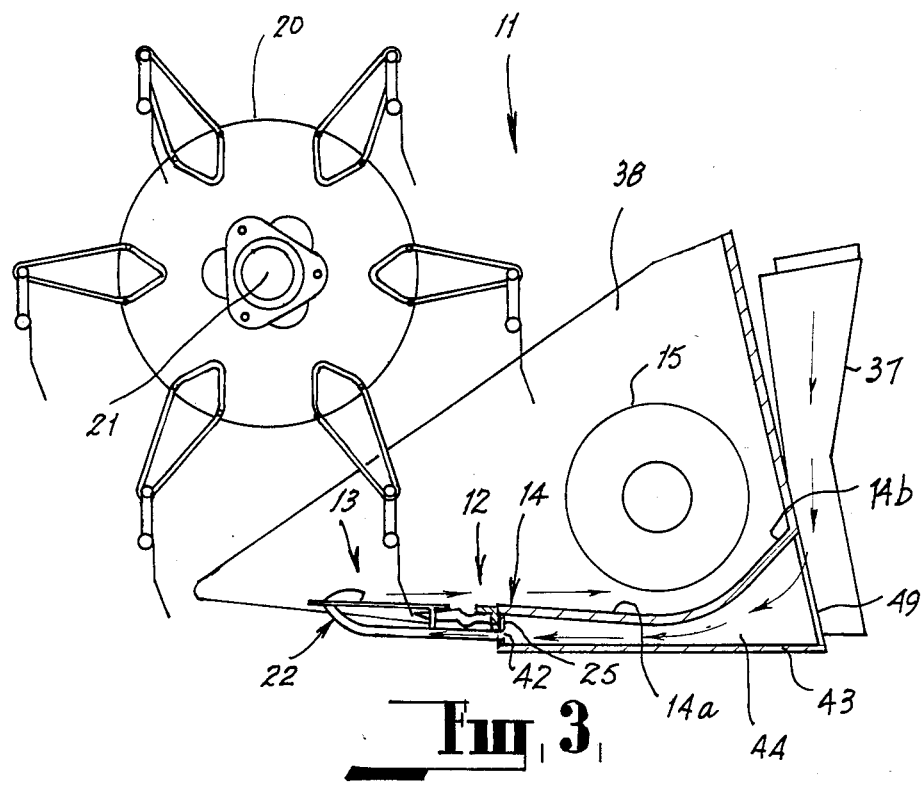
FIG. 3 is an end sectional view of the header shown in FIG. 1.
Figure 4:
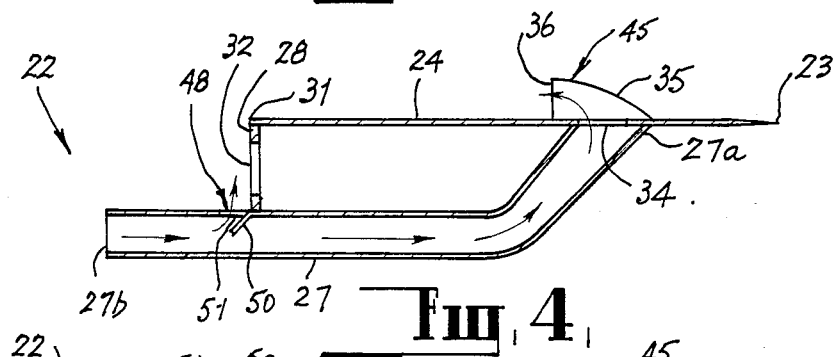
FIG. 4 is a side sectional view of the finger attachment.
Figure 5:
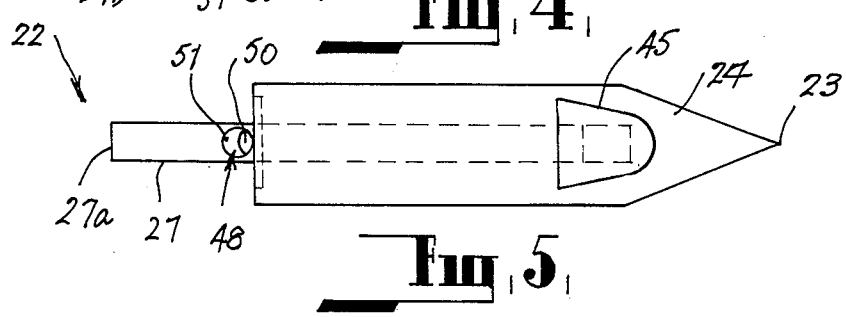
FIG. 5 is a top view of FIG. 4.

The first embodiment is directed towards an air flow harvesting system for agricultural harvesting machines, in the form of a header 11.

The header 11 generally consists of a cutting means 12, a combining means 13, a forced air supply and a rearward collecting platform 14, all of which extend transversely to the direction of travel of the header.

The header 11 is of the "open front" type and is provided with a front reel 20, side walls 38 and the main collecting platform 14 which extends rearwardly of the cutting means 12 to form the base 14a and rear wall 14b thereof. Transversely disposed within the header is a feed auger 15 which conveys reaped crop material axially therealong to further conveying means (not shown).

The cutting means 12 is in the form of a cutting assembly 16 which comprises a series of fixed fingers 17 and a reciprocating knife 18 adapted to reciprocate transversely within slotted recesses 33 provided in the fingers. Rearwardly located of the cutting assembly 16, leading towards the feed auger 15, is the leading edge of the collecting platform 14a which is provided with a front mounting 19 for the cutting assembly. The mounting 19 consists of an elongate angle member 26 which is fixedly attached to a front keeper plate 25, which shall be described in more detail later.

The reel 20 is mounted to a side supporting frame (not shown) in an elevated position for rotation about a central axis 21. The elevation of the reel can be adjusted by known means, which can provide for the complete withdrawal of the reel from its operative position in crops not requiring its use.

The combing means 13 comprises a series of auxiliary finger attachments 22, which can be permanently or detachably mounted to each of the fixed fingers 17. Each finger attachment is provided with a leading point 23 to facilitate combing of the crop and an upper substantially horizontal receiving platform 24. Each upper platform 24 has an appreciable lateral extent such that adjacent auxiliary fingers are separated by a small gap sufficient to facilitate combing of the crop. When attached to each of the fixed fingers 17, the receiving platforms collectively define a generally co-planar surface forward of the cutting means 12. The auxiliary finger 22 is further provided with a mounting fixture 41 which incorporates an air delivery duct. The mounting fixture 41 comprises an open ended elongate tube 27, essentially rectangular in cross-section, and a vertical mounting rib 28. The elongate tube 27 forms the air flow duct and has its front end 27a fixed to the underside of the receiving platform 24 so as to communicate with a hole 34 provided near the front of the platform. The rear end 27b of the tube is arranged to be fixed to another hole 42 provided in the keeper plate 25. The keeper plate 25 is itself fixedly mounted between the leading edge of the collecting platform 14a and a stump guard or belly plate 43 to form a closed chamber 44 therebetween. The keeper plate 25 extends transversely along the front of the header to receive the rear ends 27b of the tubes 27 mounted thereto in spaced relation, so that open communication is provided between the tubes and the chamber 44. The rib 28 is interposed between the under side of the receiving platform 24, near the rear terminating edge 31 thereof and the tube 27, and is provided with a hole 32 therein to receive the leading point of the corresponding fixed finger 17. The size of the hole is sufficient to accommodate the fixed finger 17 such that the longitudinal axis thereof is disposed at an oblique angle to the plane of the receiving platform 24, and further to maintain the slotted recess 33 exteriorly thereto so that the knife 18 is free to reciprocate within the recess. The rear edge 31 of the platform preferably terminates near the rib 28 so as to expose the top of the cutting assembly 16. The rear edge 31 of the platform tends to block and resist forward movement of the crops being cut during movement of the knife 18. Located at the junction between the front end 27a of each tube 27 and the receiving platform 24 is an outlet nozzle 45, having a deflector wall portion 35 and an outlet opening 36 providing communication between the tube interior and the top surface of the receiving platform via hole 34 in the platform. The combination of the wall portion 35 with the opening 36, effectively forms a jet nozzle to direct forced air supplied through the tube 27 rearwardly towards the cutting assembly 16, generally parallel to the platform surface.

The tube 27 is provided with a further outlet nozzle 48 in the form of a further hole 51, which is punched into the delivery duct at a position rearward of the first nozzle. As shown in the drawings, this position preferably is proximate the vertical rib 28 beneath the cutting assembly 16 and receiving platform 24. The further hole is punched so that a depending flap 50 may project inwardly to the duct interior so as to divert part of the air flow within the duct out through the further hole 51. It should be noted that the further outlet nozzle and hole may be provided anywhere along the duct so as to achieve a further air flow past the cutting assembly 16 and receiving platform 24, up through the planar surface defined thereby.

Disposed rearwardly of the header 11, as shown in FIG. 1, is a main manifold 37 which communicates with the chamber 44 defined between the belly plate 43 and platform base 14a. To seal this chamber to the exterior, side plates (not shown) and a back plate 49 are welded respectively between the sides and back of the belly plate and collecting platform. Thus the chamber is formed beneath the header and essentially spans the header transversely. The main manifold 37 is connected to a blower via a main delivery duct (not shown) located in a convenient position on the harvester or other propelling vehicle for the header 11, so as to provide a forced air supply. Preferably the blower is fitted in an elevated position on the harvester so that it may avoid some of the dust produced during harvesting, and in close proximity to the engine to minimise strain and stress on the header.

The operation of the harvesting system shall now be described.

In operation, the header is generally attached to the front end of a harvester and propelled through a crop to be harvested, the combing means 13 combing the crop to be cut by the cutting means 12.

Air is injected under pressure into the main manifold 37 from the blower to provide a forced air supply which is in turn fed via the chamber 44 into the respective air flow ducts formed in the tubes 27 of the auxiliary fingers 22. The pressurized air then travels upwardly through the ducts and exits at the holes 34 and further holes 51 through the outlet nozzle 45 and further nozzle 48 respectively. On exit from the hole 34, the air flow is deflected rearwardly by the wall portion 35 and is expelled via the opening 36 rearwardly along over the surface of the receiving platforms 24 towards the cutting assembly. This action effectively provides a floating air stream along each of the receiving platforms of the combing means 13 which is augmented by an upwardly directed further air flow adjacent the platforms whereby falling and incumbant ears and heads of the gathered crop can be entrained within the air stream and induced rearwardly towards the cutting means 12 and collecting platform 14. Furthermore, the air stream assists in forcing the combed crop into the cutting assembly 16 and can obviate or compliment the use of a reel or the like. In addition, due to the exposed top of the cutting assembly 16 and its disposition relative to the upper surface of the receiving platform, the air flow provides an important advantage in cleaning the cutting assembly from the cut crop during the reaping process.

The harvesting system described in the present embodiment affords significant advantages over other air flow harvesting systems, whereby the air flow technique can be used in both heavy and light crops with and without the use of the reel respectively. This can be simply effected by lowering the reel to the operative position in heavy crops, or by raising the reel to the inoperative position in light crops.

The second embodiment of the invention is directed towards a modified form of finger attachment to that described in the previous embodiment.

In the present embodiment, an auxiliary finger consists of a receiving platform, an elongate tube with air flow ducts, an outlet nozzle and vertical mounting rib arranged in a similar manner to these features included in the finger attachment described in the previous embodiment. However, in the present embodiment, the rear ends of the tubes of a series of auxiliary fingers are mutually connected to an elongate manifold member defining an inner chamber which communicates with each of the air flow ducts. The manifold member is mounted beneath the cutting assembly and is fixedly attached to the leading edge of the collecting platform. Thus a bank of auxiliary fingers are formed as an integral unit which may be connected a series of fixed fingers provided on a header of the type described in the preceding embodiment.

In this arrangement a series of supply ducts are provided which connect a main manifold, located rearwardly of the header, to each of the manifold members of the various banks of fingers. The supply ducts may be disposed between the stump guard or belly plate of the header and the collecting platform base. By adopting this arrangement, it is not necessary to seal the space between the belly plate and collecting platform as the air flow circuit is confined to the supply ducts and manifold members. However, it has been found in practice that the chamber provided in the previous embodiment is preferred, although the feature of providing a bank of auxiliary fingers as described in the present embodiment is attractive to the operator, especially when replacing defective fingers.

It should be appreciated that the scope of the present invention is not limited to the scope of the particular embodiment herein described. Moreover, the invention is not limited for use with the specific auxiliary finger attachment described herein but may be modified to suit attachment to other forms of comb so as to provide the same advantages hereinbefore mentioned. In addition, it should be appreciated that it is not necessary for every finger in the combing means to be provided with an air flow duct. Accordingly, it may be possible to employ only one air flow duct and nozzle each alternate finger, although such an arrangement would be inferior in operation to the arrangement described in the embodiments herein.

We claim:

1. A harvesting system for agricultural machines comprising: a crop cutting means disposed transversely of the direction of travel of the harvesting marchine; a crop combing means disposed adjacent to and extending forwardly of said cutting means; said combing means having a plurality of receiving platforms collectively defining a generally planar surface beginning at a point forwardly of said cutting means and extending forward of said cutting means and defining a narrow gap thereby for receiving the crop to be cut, and pneumatic means for generating a bed of air moving along the upper surface of said combing means in a direction toward said cutting means and substantially parallel to the cutting plane of said cutting means, said pneumatic means including nozzle means for discharging air in a direction substantially along said upper surface of said combing means to create said bed and delivery means for delivering air under pressure to said nozzle means, said nozzle means being located in the plane of said bed of air and said delivery means being disposed generally beneath said combing means, said nozzle means comprising an outlet nozzle disposed on the upper face of at least some of said receiving platforms to receive the forced air supply and arranged to direct a forced air flow towards the cutting means, substantially parallel to said planar surface to augment the gathering of said crop.

2. A harvesting system as claimed at claim 1 wherein the nozzle means comprises a plurality of spaced nozzles and the delivery means includes a respective delivery tube communicating with each nozzle.

3. A harvesting system as claimed at claim 1 further comprising a further nozzle means for generating an air flow upwardly through the combing means.

4. A harvesting system as claimed at claim 1, wherein the combing means comprises a plurality of fingers each provided with a respective platform and each having an air delivery duct disposed beneath said platform, said air delivery duct communicating with a respective one of said nozzles on said platform.

5. A harvesting system as claimed at claim 1 wherein the rear end of the platforms terminate adjacent the cutting means to expose said cutting means to the forced air flow from said outlet nozzles and for restraining the forward movement of the crop upon the operation of said cutting means.

6. A harvesting system as claimed at claim 1 wherein each of said outlet nozzles comprises a deflector wall portion overlying a hole provided in the receiving platform and providing an outlet for said forced air supply, and an outer opening disposed adjacent said platform directed towards the cutting means so the forced air flow on entering the wall portion via said hole is deflected towards the outer opening and subsequently towards the cutting means substantially parallel to said platform surface.

7. A harvesting system as claimed at claim 1 wherein each outlet nozzle is disposed towards the leading edge of the respective platform.

8. A harvesting system as claimed at claim 1 wherein a forced air supply is connected to series of further outlet nozzles disposed rearwardly of said first outlet nozzles beneath said platform and said cutting means, said further outlet nozzles providing a further air flow past the cutting means and platform, through the plane of said surface to further augment the gathering of said crop.

9. A harvesting system as claimed at claim 8, wherein the further outlet nozzle comprises a further hole formed in an air delivery duct, and having a depending flap portion which projects inwardly to the duct interior to divert part of the air flow within the duct out through said further hole.

10. A harvesting system as claimed at claim 1 wherein a forced air supply is provided from a source located remotely from the combing means and which is delivered to the combing means from a manifold disposed rearwardly of the cutting means and combing means, on the underside of the system.

* * * * *